(12) United States Patent
Liu et al.

(10) Patent No.: US 10,989,949 B2
(45) Date of Patent: Apr. 27, 2021

(54) LIQUID CRYSTAL DISPLAY MODULE, MANUFACTURING METHOD THEREOF AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Junhuan Liu, Beijing (CN); Ruifeng Yang, Beijing (CN); Huaxu Yang, Beijing (CN); Libao Cui, Beijing (CN); Feng Han, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 80 days.

(21) Appl. No.: 16/337,308

(22) PCT Filed: Sep. 19, 2018

(86) PCT No.: PCT/CN2018/106465
§ 371 (c)(1),
(2) Date: Mar. 27, 2019

(87) PCT Pub. No.: WO2019/134400
PCT Pub. Date: Jul. 11, 2019

(65) Prior Publication Data
US 2020/0387022 A1 Dec. 10, 2020

(30) Foreign Application Priority Data
Jan. 2, 2018 (CN) .................. 201810002008.X

(51) Int. Cl.
*G02F 1/1333* (2006.01)
*G02F 1/1335* (2006.01)
(Continued)

(52) U.S. Cl.
CPC .. *G02F 1/133382* (2013.01); *G02F 1/133308* (2013.01); *G02F 1/133514* (2013.01);
(Continued)

(58) Field of Classification Search
CPC ......... G02F 1/133382; G02F 1/133308; G02F 1/133514; G02F 1/133528; G02F 1/133602; G02F 1/136209
See application file for complete search history.

(56) References Cited

U.S. PATENT DOCUMENTS

2014/0028928 A1  1/2014  Yu et al.
2018/0017825 A1*  1/2018  Katagiri ............ G02F 1/133305
2019/0302513 A1*  10/2019  Ide ..................... G02F 1/133615

FOREIGN PATENT DOCUMENTS

CN    102122098 A    7/2011
CN    203070248 U    7/2013
(Continued)

OTHER PUBLICATIONS

First Office Action for CN Appl. No. 201810002008.X, dated Dec. 24, 2019, 15 pages.
(Continued)

*Primary Examiner* — Dung T Nguyen
(74) *Attorney, Agent, or Firm* — The Webb Law Firm

(57) ABSTRACT

The present disclosure provides a liquid crystal display module, a manufacturing method thereof and a display device. The liquid crystal display module includes: a cover plate; a TFT array substrate disposed on one side of the cover plate; and an opposite substrate disposed on one side of the TFT array substrate away from the cover plate, a
(Continued)

liquid crystal layer being filled between the TFT array substrate and the opposite substrate, the TFT array substrate includes a first portion opposite to the opposite substrate and a second portion extending beyond the opposite substrate, a drive circuit being disposed on one side of the second portion away from the cover plate; a backlight disposed on one side of the opposite substrate away from the TFT array substrate, and a heat shielding layer disposed between the second portion and the backlight.

15 Claims, 3 Drawing Sheets

(51) Int. Cl.
  *G02F 1/13357* (2006.01)
  *G02F 1/1362* (2006.01)
(52) U.S. Cl.
  CPC .. *G02F 1/133528* (2013.01); *G02F 1/133602* (2013.01); *G02F 1/136209* (2013.01)

(56) References Cited

FOREIGN PATENT DOCUMENTS

| | | |
|---|---|---|
| CN | 204256712 U | 4/2015 |
| CN | 105259700 A | 1/2016 |
| CN | 205193392 U | 4/2016 |
| CN | 105572923 A | 5/2016 |
| CN | 107146533 A | 9/2017 |
| CN | 107179631 A | 9/2017 |
| CN | 108051940 A | 5/2018 |
| JP | 2017-044979 A | 3/2017 |

OTHER PUBLICATIONS

International Search Report and Written Opinion for International Appl. No. PCT/CN2018/106465, dated Dec. 27, 2018.

\* cited by examiner

LIQUID CRYSTAL DISPLAY MODULE, MANUFACTURING METHOD THEREOF AND DISPLAY DEVICE

CROSS-REFERENCE TO RELATED APPLICATIONS

The present application is a U.S. National Stage Application under 35 U.S.C. § 371 of International Patent Application No. PCT/CN2018/106465, filed on Sep. 19, 2018, which claims priority to CN Application No. 201810002008.X, filed on Jan. 2, 2018, the disclosed content of both of which is hereby incorporated by reference into the present application in entirety.

TECHNICAL FIELD

The present disclosure relates to the technical field of liquid crystal display, and in particular to a liquid crystal display module, a manufacturing method thereof and a display device.

BACKGROUND

In a current liquid crystal display module, a liquid crystal layer is disposed between a cover plate and a TFT (thin film transistor) array substrate. The intensity of light transmission of the liquid crystal layer is controlled by the TFT array substrate to realize liquid crystal display.

SUMMARY

According to a first aspect of the embodiments of the present disclosure, a liquid crystal display module is provided. The liquid crystal display module comprises: a cover plate; a TFT array substrate disposed on one side of the cover plate; an opposite substrate disposed on one side of the TFT array substrate away from the cover plate, a liquid crystal layer being filled between the TFT array substrate and the opposite substrate, wherein the TFT array substrate includes a first portion opposite to the opposite substrate and a second portion extending beyond the opposite substrate, a drive circuit being disposed on one side of the second portion away from the cover plate; a backlight disposed on one side of the opposite substrate away from the TFT array substrate; and a heat shielding layer disposed between the second portion and the backlight.

In some embodiments, the heat shielding layer comprises an elastic material.

In some embodiments, the elastic material is foam or silica gel froth.

In some embodiments, the liquid crystal display module also comprises: a first heat conducting plate disposed between the heat shielding layer and the backlight.

In some embodiments, the first heat conducting plate is a graphite flake or a metal plate.

In some embodiments, the liquid crystal display module further comprises: a second heat conducting plate disposed between the heat shielding plate and the second portion.

In some embodiments, the second heat conducting plate is a graphite flake or a metal plate.

In some embodiments, the liquid crystal display module also comprises: a light shielding layer disposed within the TFT array substrate and between a TFT circuit of the TFT array substrate and one side face of the TFT array substrate close to the cover plate.

In some embodiments, the liquid crystal display module also comprises: a polarizing plate disposed between the cover plate and the TFT array substrate.

In some embodiments, the liquid crystal display module also comprises: a color filter substrate disposed between the polarizing plate and the TFT array substrate.

In some embodiments, the opposite substrate is a color filter substrate.

According to a second aspect of the embodiments of the present disclosure, a display device is provided. The display device includes a liquid crystal display module according to any of the aforementioned embodiments.

According to a third aspect of the embodiments of the present disclosure, a manufacturing method of a liquid crystal display module is provided. This method comprises: providing a TFT array substrate and an opposite substrate, wherein the TFT array substrate is bonded to a cover plate, the TFT array substrate includes a first portion opposite to the opposite substrate and a second portion extending beyond the opposite substrate, and a drive circuit is disposed on one side of the second portion away from the cover plate; disposing a heat shielding layer between the second portion and a backlight; filling a liquid crystal layer between the TFT array substrate and the opposite substrate.

In some embodiments, the manufacturing method also comprises: disposing a first heat conducting layer between the heating shielding layer and the backlight.

In some embodiments, the manufacturing method also comprises: disposing a second heat conducting plate between the heat shielding layer and the second portion.

In some embodiments, the manufacturing method also comprises: providing a light shielding layer within the TFT array substrate, wherein the light shielding layer is disposed between a TFT circuit of the TFT array substrate and one side face of the TFT array substrate close to the cover plate.

In some embodiments, a polarizing plate is disposed between the TFT array substrate and the cover plate.

In some embodiments, a color filter substrate is disposed between the polarizing plate and the TFT array substrate.

In some embodiments, the opposite substrate is a color filter substrate.

Further features of the present disclosure, as well as advantages thereof, will become clearer from the following detailed description of exemplary embodiments of the present disclosure with reference to the accompanying drawings.

BRIEF DESCRIPTION OF THE DRAWINGS

The accompanying drawings, which constitute a part of the specification, illustrate embodiments of the present disclosure and, together with the description, serve to explain the principles of the present disclosure.

The present disclosure may be understood more clearly from the following detailed description with reference to the accompanying drawings, wherein.

Figure 1:
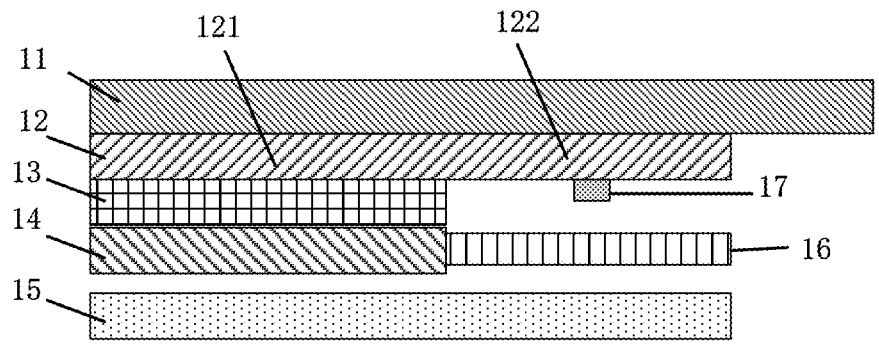
FIG. 1 is a structural diagram of a liquid crystal module according to one embodiment of the present disclosure.

It should be understood that the dimensions of the various parts shown in the drawings are not drawn according to the actual proportional relationship. In addition, the same or similar reference signs denote the same or similar components.

DETAILED DESCRIPTION

The exemplary embodiments of the present disclosure will be described in detail with reference to the accompanying drawings. The description of the exemplary embodiments is intended to be merely illustrative, and is not meant to be limitation on the present disclosure and its application or use in any way. The present disclosure may be implemented in many different forms, not limited to the embodiments described herein. These embodiments are provided so that this disclosure will be thorough and complete, and will fully convey the scope of the disclosure to those skilled in the art. It should be noted that, unless otherwise specified, relative arrangement of components and steps, ingredients of the materials, numerical expressions and numerical values set forth in these embodiments are to be construed as merely illustrative, not as a limitation.

The terms "first", "second" and similar words used in the present disclosure do not denote any order, quantity, or importance, but merely serve to distinguish different parts. Similar words like "include" or "comprise" mean that the element that precedes the word covers the elements listed after that term, but does not exclude the possibility of also covering other elements. "Up", "Down", "Left", "Right", and the like are used only to indicate a relative positional relationship, and when the absolute position of the described object is changed, the relative positional relationship may also change correspondingly.

In the present disclosure, when it is described that a specific component is located between a first component and a second component, an intervening component may exist between the specific component and the first or second component, or there may be no intervening component. When it is described that a specific component is connected to other components, the specific component may be directly connected with the other components without having an intervening component therebetween, or may not be directly connected with the other components but have an intervening component therebetween.

Unless otherwise specifically defined, all terms (including technical terms or scientific terms) used in the present disclosure have the same meanings as understood by an ordinary person skilled in the art to which the present disclosure belong. It will also be understood that terms defined in, for example, common dictionaries should be interpreted as having meanings that are consistent with their meanings in the context of the relevant art, and should not be interpreted in an idealized or extremely formal sense unless expressly defined here.

Techniques, methods, and devices known to an ordinary person skilled in the relevant art may not be discussed in detail but, where appropriate, such techniques, methods, and devices are to be considered part of the description.

The inventor has noticed that, there is a certain distance between a single-layer region of the TFT array substrate and the cover plate in the related art. The single-layer region of the TFT array substrate cannot be supported effectively, and is damaged easily during a drop process.

The present disclosure provides a solution for avoiding breakage of the single-layer region of a TFT array substrate during the drop process.

FIG. 1 is a structural diagram of a liquid crystal module according to one embodiment of the present disclosure.

As shown in FIG. 1, the liquid crystal display module includes a cover plate 11, a TFT array substrate 12, a liquid crystal layer 13, an opposite substrate 14, a backlight 15, a heat shielding layer 16 and a drive circuit 17.

In some embodiments, the cover plate 11 may be a cover plate made of glass or other transparent materials.

As shown in FIG. 1, the TFT array substrate 12 is disposed on one side of the cover plate 11, and the opposite substrate 14 is disposed on one side of the TFT array substrate 12 away from the cover plate 11. A liquid crystal layer 13 is filled between the TFT array substrate 12 and the opposite substrate 14. The TFT array substrate 12 includes a first portion 121 opposite to the opposite substrate 14 and a second portion 122 that extends beyond the opposite substrate 14. The second portion 122 of the TFT array substrate 12 is the single-layer region. Since the TFT array substrate 12 is disposed between the cover plate 11 and the liquid crystal layer 13, the second portion 122 of the TFT array substrate 12 can be fixed and supported effectively by the cover plate 11.

Moreover, the drive circuit 17 is disposed on one side of the second portion 122 of the TFT array substrate 12 away from the cover plate 11. The backlight 15 is disposed on one side of the opposite substrate 14 away from the TFT array substrate 12. The heat shielding layer 16 is disposed between the second portion 122 of the TFT array substrate 12 and the backlight 15.

In some embodiments, the opposite substrate 14 is a color filter substrate.

As shown in FIG. 1, the drive circuit 17 is disposed on one side of the second portion 122 of the TFT array substrate 12 away from the cover plate 11. That is, the drive circuit 17 is disposed opposite to the backlight 15.

In some embodiments, a heat shielding layer 16 is disposed between the second portion 122 of the TFT array substrate 12 and the backlight 15. Thus, the influence of the heat radiation generated by the backlight 15 exerted on the drive circuit 17 can be avoided effectively.

In the liquid crystal display module provided in the above embodiments of the present disclosure, the TFT array substrate is disposed between the cover plate and the liquid crystal layer, so that the second portion of the TFT array substrate is fixed and supported effectively by the cover plate, thereby the single layer region of the TFT array substrate is prevented effectively from being damaged due to dropping down. In addition, the heat shielding layer is disposed between the second portion of the TFT array substrate and the backlight, so that the heat radiation generated by the backlight is prevented effectively from affecting the driving circuit.

In some embodiments, the heat shielding layer 16 comprises an elastic material. For example, the heat shielding layer 16 comprises an elastic material such as foam or silica gel froth, etc. Since the heat shielding layer 16 comprises an elastic material, the heat shielding layer 16 can be deformed to some extent when it is dropped, so that the impact of the TFT array substrate 12 due to dropping can be alleviated, thereby the TFT array substrate 12 can be further protected.

Figure 2:
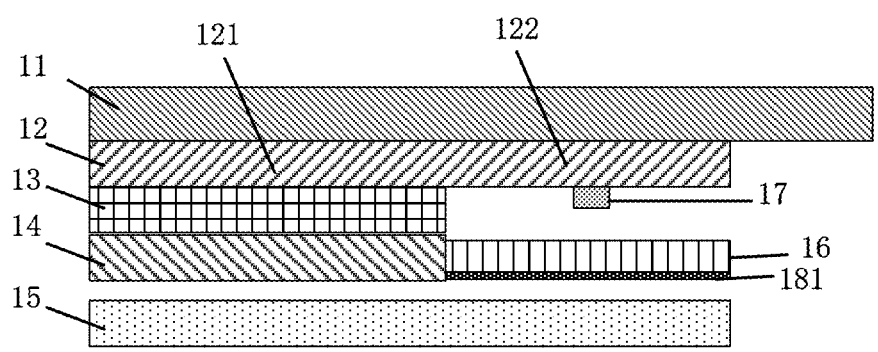
FIG. 2 is a structural diagram of a liquid crystal module according to another embodiment of the present disclosure.

FIG. 2 is a structural diagram of a liquid crystal module according to another embodiment of the present disclosure. A difference between FIG. 2 and FIG. 1 is that, in the embodiment shown in FIG. 2, a first heat conducting plate 181 is disposed between the heat shielding layer 16 and the backlight 15.

The first heat conducting plate 181 is disposed between the heat shielding layer 16 and the backlight 15, so that the heat generated by the backlight 15 can be diffused rapidly on a plane of the heat conducting plate 181. Therefore, the temperature of the local area of the heat shielding layer 16 can be prevented effectively from being excessively high.

In some embodiments, the first heat conducting plate 181 comprises a material with good heat dissipation performance. For example, the material used for the first heat conducting plate 181 may be graphite, or a metal such as copper or aluminum, etc. In other words, the heat conducting plate 181 comprises a graphite flake or a metal plate.

Figure 3:
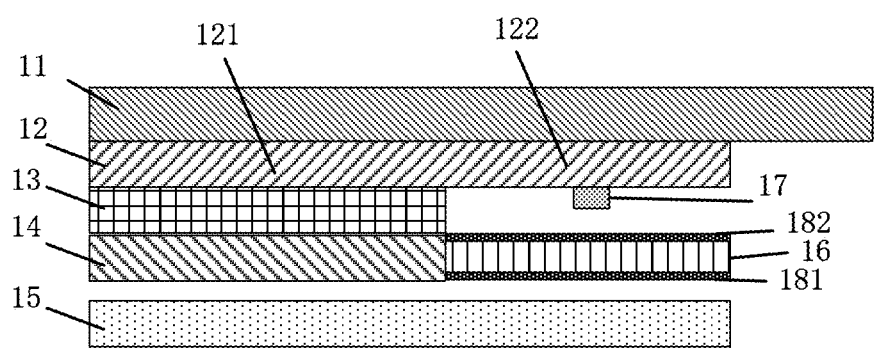
FIG. 3 is a structural diagram of a liquid crystal module according to still another embodiment of the present disclosure.

FIG. 3 is a structural diagram of a liquid crystal module according to still another embodiment of the present disclosure. The difference between FIG. 3 and FIG. 2 is that, in the embodiment shown in FIG. 3, a second heat conducting plate 182 is disposed between the heat shielding layer 16 and the second portion 122 of the TFT array substrate 12.

For the same reason as described above, the second heat conducting plate 182 is disposed between the heat shielding layer 16 and the second portion 122 of the TFT array substrate 12. Thus, the heat generated by the drive circuit 17 may diffuse rapidly in a plane of the heat conducting plate 182, thereby the temperature of the local area of the heat shielding layer 16 is prevented effectively from being excessively high.

In some embodiments, the second heat conducting plate 182 comprises a material with good heat dissipation performance. For example, the material used for the second heat conducting plate 182 may be graphite, or a metal such as copper or aluminum, etc. In other words, the heat conducting plate 182 comprises a graphite flake or a metal plate.

Figure 4:
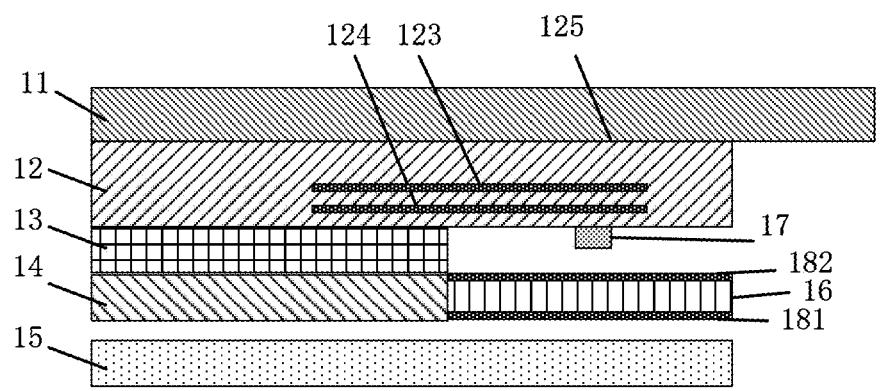
FIG. 4 is a structural diagram of a liquid crystal module according to still another embodiment of the present disclosure.

FIG. 4 is a structural diagram of a liquid crystal module according to still another embodiment of the present disclosure. The difference between FIG. 4 and FIG. 3 is that, in the embodiment shown in FIG. 4, a light shielding layer 123 is disposed within the TFT array substrate 12. The light shielding layer 123 is disposed between a TFT circuit 124 of the TFT array substrate 12 and one side face 125 of the TFT array substrate 12 close to the cover plate 11.

The light shielding layer 123 is disposed in the TFT array substrate 12 to effectively block the reflection of the TFT circuit 124, and thereby a user experience can be improved effectively.

In some embodiments, the light shielding layer 123 may comprise black adhesive or other light-shielding material.

Figure 5:
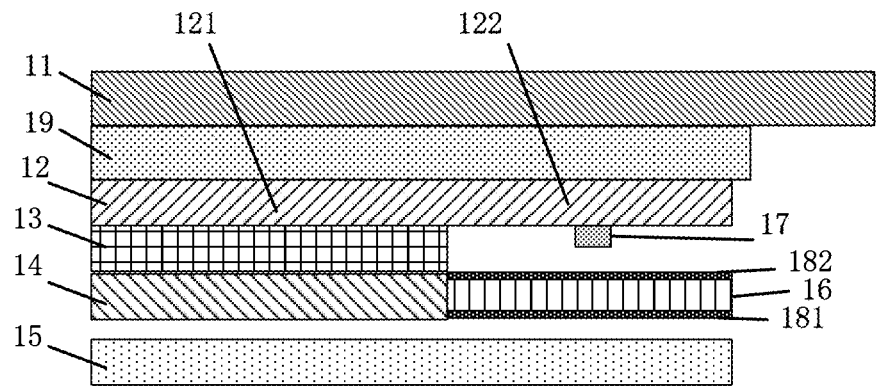
FIG. 5 is a structural diagram of a liquid crystal module according to still another embodiment of the present disclosure.

FIG. 5 is a structural diagram of a liquid crystal module according to still another embodiment of the present disclosure;

The difference between FIG. 5 and FIG. 3 is that, in the embodiment shown in FIG. 5, a polarizing plate 19 is disposed between the cover plate 11 and the TFT array substrate 12. For example, the cover plate 11, the polarizing plate 19 and the TFT array substrate 12 are bonded and fixed sequentially with optical glue, the second portion 122 of the TFT array substrate 12 can be fixed and supported effectively, thereby the second portion 122 of the TFT array substrate 12 can be prevented effectively from being damaged due to dropping down.

Figure 6:
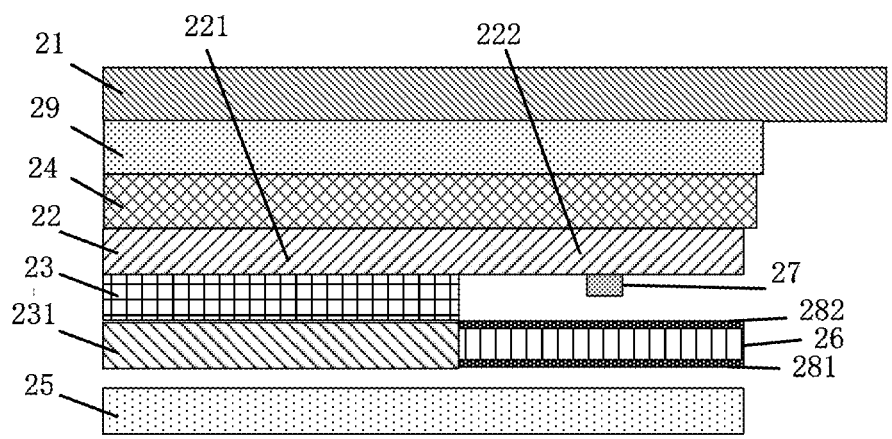
FIG. 6 is a structural diagram of a liquid crystal module according to still another embodiment of the present disclosure.

FIG. 6 is a structural diagram of a liquid crystal module according to still another embodiment of the present disclosure.

The difference between FIG. 6 and FIG. 5 is that, in the embodiment shown in FIG. 6, a color filter substrate is disposed between the TFT array substrate and the polarizing plate.

As shown in FIG. 6, the polarizing plate 29 is disposed on one side of the cover plate 21. The color filter substrate 24 is disposed on one side of the polarizing plate 29 away from the cover plate 21. The TFT array substrate 22 is disposed on one side of color filter substrate 24 away from the polarizing plate 29. The opposite substrate 231 (i.e., sealing substrate) is disposed on one side of the TFT array substrate 22 away from the color filter substrate 24, and a liquid crystal layer 23 is filled between the TFT array substrate 22 and the opposite substrate 231. The TFT array substrate 22 includes a first portion 221 opposite to the opposite substrate 231 and a second portion 222 extending beyond the opposite substrate 231. The second portion 222 of the TFT array substrate 22 is the single-layer region.

Moreover, a drive circuit 27 is disposed on one side of the second portion 222 of the TFT array substrate 22 away from the color filter substrate 24. The backlight 25 is disposed on one side of the opposite substrate 231 away from the TFT array substrate 22. The heat shielding layer 26 is disposed between the second portion 222 of the TFT array substrate 22 and the backlight 25, so that the heat radiation generated by the backlight 25 is prevented effectively from affecting the driving circuit 27.

Moreover, as shown in FIG. 6, a first heat conducting plate 281 is disposed between the heat shielding layer 26 and the backlight 25, and a second heat conducting plate 282 is provided between the heat shielding layer 26 and the second portion 222. The heat generated by the backlight 25 can be diffused rapidly on a plane of the heat conducting plate 281, and the heat generated by the drive circuit 27 can be diffused rapidly on a plane of the heat conducting plate 282, thereby the temperature of the local region of the heat shielding layer 26 can be prevented effectively from being excessively high.

As shown in FIG. 6, the color filter substrate 24 is disposed between the polarizing plate 29 and the TFT array substrate 22, a better chromatic effect can be obtained. Therefore, while the occurrence of damage of the single-layer region of the TFT array substrate can be avoided effectively, the user experience can be further improved.

Figure 7:
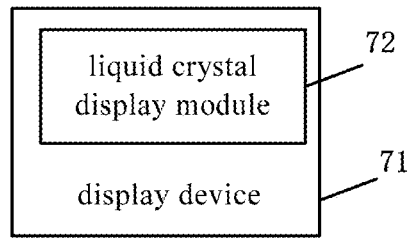
FIG. 7 is a structural diagram of a display device according to one embodiment of the present disclosure.

FIG. 7 is a structural diagram of a display device according to one embodiment of the present disclosure.

As shown in FIG. 7, the display device 71 includes a liquid crystal display module 72. The liquid crystal display module 72 may be a liquid crystal display module in any of the embodiments in FIGS. 1 to 6. The display device 71 may be any product for component having a display function such as display, mobile phone, tablet computer, television, notebook computer, digital photo frame, navigator, etc.

Since the display device adopts the liquid crystal display module according to any one of the embodiments of FIG. 1 to FIG. 6, the damage of the single-layer region of the TFT array substrate can be avoided effectively when the display device is dropped.

Figure 8:
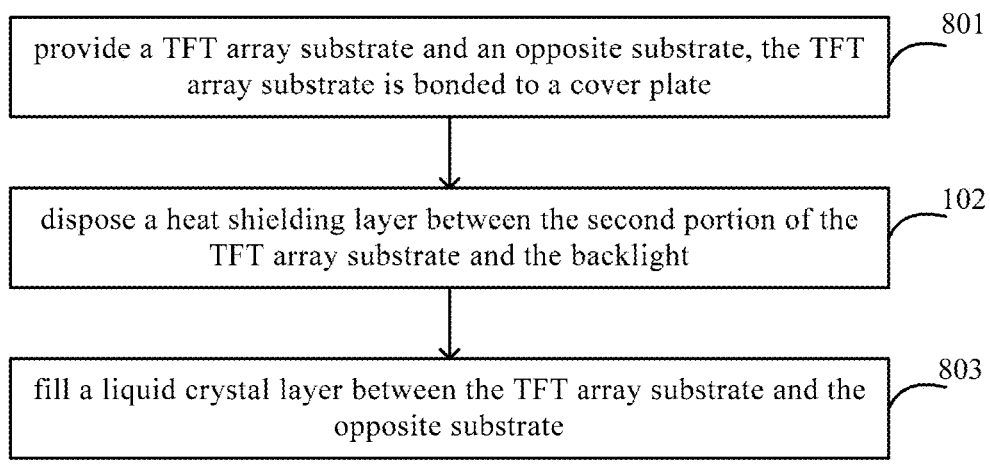
FIG. 8 is a flow chart of a manufacturing method of the liquid crystal display module according to one embodiment of the present disclosure.

FIG. 8 is a flow chat of a manufacturing method of the liquid crystal display module according to one embodiment of the present disclosure.

In step 801, a TFT array substrate and an opposite substrate are provided. The TFT array substrate is bonded to the cover plate. The TFT array substrate includes a first portion opposite to the opposite substrate and a second portion extending beyond the opposite substrate, and a drive circuit is disposed on one side of the second portion away from the cover plate. The second portion of the TFT array substrate is the single-layer region.

In some embodiments, a polarizing plate is bonded on the cover plate, and then the TFT array substrate is bonded on the polarizing plate. The cover plate, the polarizing plate and the TFT array substrate are bonded and fixed sequentially with the optical glue, the second portion of the TFT array substrate can be fixed and supported effectively, thereby the second portion of the TFT array substrate can be prevented effectively from being damaged due to dropping down.

In some embodiments, the opposite substrate is a color filter substrate.

In step 802, a heat shielding layer is disposed between the second portion of the TFT array substrate and the backlight.

In step 803, a liquid crystal layer is filled between the TFT array substrate and the opposite substrate.

In the manufacturing method of the liquid crystal display module provided in the above embodiments of the present disclosure, the TFT array substrate is disposed between the cover plate and the liquid crystal layer, the second portion of the TFT array substrate is fixed and supported effectively by the cover plate, thereby the single-layer region of the TFT array substrate can be prevented effectively from being damaged due to dropping down. In addition, the heat shielding layer is disposed between the second portion of the TFT array substrate and the backlight, the heat radiation generated by the backlight is prevented effectively from affecting the driving circuit.

In some embodiments, a first heat conducting layer is disposed between the heat shielding layer and the backlight, so that the heat generated by the backlight can be diffused rapidly on a plane of the heat conducting plate. Therefore, the temperature of the local region of the heat shielding layer can be prevented effectively from being excessively high.

In some embodiments, a second heat conducting plate is disposed between the heat shielding layer and the second portion of the TFT array substrate, so that heat generated by the drive circuit can be diffused rapidly in a plane of the heat conducting plate, thereby the temperature of the local area of the heat shielding layer can be prevented effectively from being too high.

In some embodiments, a light shielding layer is disposed within the TFT array substrate. The light shielding layer is disposed between a TFT circuit of the TFT array substrate and one side face of the TFT array substrate close to the cover plate. The light shielding layer is disposed in the TFT array substrate, so that the reflection of the TFT circuit can be blocked effectively, thereby the user experience can be improved effectively.

It should be noted that although the steps of the method are shown in a certain order in the figures, this does not mean that the steps of the method must be performed in the order shown. Instead, these steps can be performed in a reverse or parallel order without departing from the spirit and principles of the invention.

By implementing the solution of the present disclosure, at least one of the following advantageous effects can be obtained:

1) The position of the TFT array substrate is adjusted, so that the single-layer region of the TFT array substrate is fixed effectively, thereby the single-layer region of the TFT array substrate is prevented effectively from being damaged due to dropping down.

2) The heat shielding layer is disposed between the drive circuit disposed on the TFT array substrate and the backlight, the interference of the heat radiation generated by the backlight on the driving circuit is effectively avoided, and vibration damping protection is further provided.

3) The heat conducting plate is disposed on both sides of the heat shielding layer, the heat energy generated by the backlight and the drive circuit is diffused effectively, thereby the temperature of the local area on the heat shielding layer is prevented effectively from being excessively high.

Up to this point, the embodiments of the present disclosure have been described in detail. In order to avoid obscuring the concepts of the present disclosure, some details known in the art are not described. Those skilled in the art can totally understand how to implement the technical solution disclosed here according to the above description.

Although some specified embodiments of the present disclosure have been explained in detail by the examples, those skilled in the art shall understand that the above examples are only intended for making explanation rather than for limiting the scope of the present disclosure. Those skilled in the art shall understand that the above embodiments can be amended or equivalent substitute of part of the technical features can be performed without deviating from the scope and spirit of the present disclosure. The scope of the present disclosure is defined by the following claims.

What is claimed is:

1. A liquid crystal display module, comprising:
   a cover plate;
   a TFT array substrate disposed on one side of the cover plate;
   an opposite substrate disposed on one side of the TFT array substrate away from the cover plate, a liquid crystal layer being filled between the TFT array substrate and the opposite substrate, wherein the TFT array substrate includes a first portion opposite to the opposite substrate and a second portion extending beyond the opposite substrate, a drive circuit being disposed on one side of the second portion away from the cover plate;
   a backlight disposed on one side of the opposite substrate away from the TFT array substrate;
   a heat shielding layer disposed between the second portion and the backlight;
   a polarizing plate disposed between the cover plate and the TFT array substrate; and
   a color filter substrate disposed between the polarizing plate and the TFT array substrate.

2. The liquid crystal display module according to claim 1, wherein the heat shielding layer comprises an elastic material.

3. The liquid crystal display module according to claim 2, wherein the elastic material is foam or silica gel froth.

4. The liquid crystal display module according to claim 1, further comprising:
   a first heat conducting plate disposed between the heat shielding layer and the backlight.

5. The liquid crystal display module according to claim 4, wherein the first heat conducting plate is a graphite flake or a metal plate.

6. The liquid crystal display module according to claim 4, further comprising:
   a second heat conducting plate disposed between the heat shielding layer and the second portion.

7. The liquid crystal display module according to claim 6, wherein the second heat conducting plate is a graphite flake or a metal plate.

8. The liquid crystal display module according to claim 1, further comprising:
  a light shielding layer disposed within the TFT array substrate and between a TFT circuit of the TFT array substrate and one side face of the TFT array substrate close to the cover plate.

9. The liquid crystal display module according to claim 1, wherein
  the opposite substrate is a color filter substrate.

10. A display device, comprising the liquid crystal display module according to claim 1.

11. A manufacturing method of a liquid crystal display module, comprising:
  providing a TFT array substrate and an opposite substrate, wherein the TFT array substrate is bonded to a cover plate, the TFT array substrate includes a first portion opposite to the opposite substrate and a second portion extending beyond the opposite substrate, a drive circuit is disposed on one side of the second portion away from the cover plate, a polarizing plate is disposed between the TFT array substrate and the cover plate, and a color filter substrate is disposed between the polarizing plate and the TFT array substrate;
  disposing a heat shielding layer between the second portion and a backlight; and
  filling a liquid crystal layer between the TFT array substrate and the opposite substrate.

12. The manufacturing method according to claim 11, further comprising:
  disposing a first heat conducting layer between the heat shielding layer and the backlight.

13. The manufacturing method according to claim 12, further comprising:
  disposing a second heat conducting plate between the heat shielding layer and the second portion.

14. The manufacturing method according to claim 11, further comprising:
  disposing a light shielding layer within the TFT array substrate and between a TFT circuit of the TFT array substrate and one side face of the TFT array substrate close to the cover plate.

15. The manufacturing method according to claim 11, wherein
  the opposite substrate is a color filter substrate.

* * * * *